US008834661B1

(12) United States Patent
Ziggi et al.

(10) Patent No.: US 8,834,661 B1
(45) Date of Patent: Sep. 16, 2014

(54) ROW BAR RING-TO-RING TRANSFER USING SINGLE-SIDED ADHESIVE FILM AND VACUUM

(71) Applicant: Western Digital Technologies, Inc., Irvine, CA (US)

(72) Inventors: Ziggi, Medan (ID); Michael Chia Loke Lim, Sibu (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/778,870

(22) Filed: Feb. 27, 2013

(51) Int. Cl.
*B29C 65/50* (2006.01)
*B32B 37/10* (2006.01)
*B32B 37/12* (2006.01)
*B32B 38/10* (2006.01)
*B32B 43/00* (2006.01)
*B24B 1/00* (2006.01)
*B24B 5/00* (2006.01)
*B24B 47/22* (2006.01)
*B25B 11/00* (2006.01)
*G11B 5/84* (2006.01)

(52) U.S. Cl.
CPC . *G11B 5/84* (2013.01); *B25B 11/00* (2013.01); *B25B 11/005* (2013.01)
USPC ............. 156/235; 156/249; 451/28; 451/398

(58) Field of Classification Search
USPC ........ 156/235, 247, 249, 272.2, 273.5, 275.5, 156/308.2, 540, 541, 580; 451/28, 398
See application file for complete search history.

(56) References Cited

U.S. PATENT DOCUMENTS

| | | |
|---|---|---|
| 5,117,589 A | 6/1992 | Bischoff et al. |
| 6,217,425 B1 | 4/2001 | Shindou et al. |
| 6,261,165 B1 | 7/2001 | Lackey et al. |
| 6,375,539 B1 | 4/2002 | Sudo et al. |
| 6,466,257 B1 | 10/2002 | Baugh et al. |
| 6,551,438 B1 | 4/2003 | Tanemura |
| 6,604,989 B2 | 8/2003 | Yanagida et al. |
| 6,679,760 B2 | 1/2004 | Fukuroi et al. |
| 6,802,761 B1 | 10/2004 | Beaucage et al. |
| 6,872,123 B2 | 3/2005 | Sudo et al. |
| 6,884,148 B1 | 4/2005 | Dovek et al. |
| 6,949,158 B2 * | 9/2005 | Ball et al. ...................... 156/154 |
| 7,072,136 B2 | 7/2006 | Pit et al. |
| 7,681,303 B2 | 3/2010 | Kondo et al. |
| 7,871,306 B1 | 1/2011 | Lytle |
| 8,136,805 B1 | 3/2012 | Lee |
| 2002/0016130 A1 | 2/2002 | Nomura et al. |
| 2004/0033763 A1 | 2/2004 | Bunch et al. |
| 2004/0176013 A1 | 9/2004 | Church et al. |
| 2005/0002124 A1 | 1/2005 | Bunch et al. |
| 2007/0123150 A1 | 5/2007 | Bunch et al. |
| 2008/0141522 A1 | 6/2008 | Baer et al. |
| 2009/0313811 A1 | 12/2009 | Takahashi et al. |
| 2013/0244541 A1 | 9/2013 | Yaemglin et al. |

* cited by examiner

*Primary Examiner* — Sing P Chan (57) ABSTRACT

Row bars are attached to a lapping ring by a first single-sided adhesive film that adheres to the row bars and are secured to a first lapping ring by a vacuum. After backside lapping is performed on the row bars, the row bars are transferred to a second lapping ring with second single-sided adhesive film by compressing the row bars between the adhesive films and deactivating the vacuum, thereby releasing the row bars from the first lapping ring and providing ring-to-ring transfer without peeling the row bars off the first single-sided adhesive film. Lapping rings used for this process include vacuum channels and slots for holding the row bars so that the top surfaces of the row bars and lapping ring are substantially flat. Ring-to-ring transfer tools are used to transfer row bars between the backside lapping ring and the frontside lapping ring with minimal handling of the row bars.

14 Claims, 9 Drawing Sheets

ROW BAR RING-TO-RING TRANSFER USING SINGLE-SIDED ADHESIVE FILM AND VACUUM

FIELD

The present disclosure relates generally to lapping processes and apparatuses used for fabricating magnetic heads that are incorporated into magnetic disk drives, and more particularly, to lapping processes and apparatuses that reduce row bar handling and damage.

BACKGROUND

Magnetic disk drives are used to store and retrieve data in many electronic devices including computers, televisions, video recorders, servers, digital recorders, etc. A typical magnetic disk drive includes a head having a slider and a transducer with a read and write element that is in very close proximity to a surface of a rotatable magnetic disk. As the magnetic disk rotates beneath the head, a thin air bearing is formed between the surface of the magnetic disk and an air bearing surface (ABS) of the slider. The read and write elements of the head are alternatively used to read and write data while a suspension assembly positions the head along magnetic tracks on the magnetic disk. The magnetic tracks on the magnetic disks are typically concentric circular regions on the magnetic disks, onto which data can be stored by writing to it and retrieved by reading from it.

The slider is aerodynamically designed to fly above a rotating magnetic disk by virtue of an air bearing created between the ABS of the slider and the rotating magnetic disk. The ABS is the portion of the slider surface which is closest to the rotating magnetic disk, which is typically the head portion of the slider. In order to maximize the efficiency of the head, the sensing elements (i.e., the read and write heads) are designed to have precise dimensional relationships to each other. In addition, the distance between the ABS and the rotating magnetic disk is tightly controlled. The dimension that relates to the write function is known as the throat height and the dimension that relates to the read function is known as the stripe height. Both the stripe height and the throat height are controlled by a lapping process.

The lapping process is performed on row bars, which are rows of sliders/heads, and includes backside lapping followed by frontside lapping. During the lapping process, row bars are mounted on a separate lapping ring at each lapping operation using a separate double-sided adhesive film.

The row bar is first mounted on a first lapping ring at the backside lapping operation using a first double-sided adhesive film that is stuck to the row bar on one side of the film and stuck to the first lapping ring on the opposite side of the film. Once the row bars are attached to the first lapping ring using the first double-sided adhesive film, backside lapping is performed on the row bars. After the backside lapping is completed, the row bars are manually peeled off the first double-sided adhesive film by an operator using tweezers. After the row bars are peeled off the first double-sided adhesive tape, the row bars are cleaned. The row bars are then mounted on a second lapping ring at the frontside lapping operation using a second double-sided adhesive film that is stuck to the row bar on one side of the film and stuck to the second lapping ring on the opposite side of the film. Once the row bars are attached to the second lapping ring using the second double-sided adhesive film, frontside lapping is performed on the sides of the row bars that were not previously lapped using backside lapping.

A drawback to the lapping approach described above is that the row bars can be damaged or broken as they are manually peeled off the first double-sided adhesive film between the lapping operations. Another drawback is the lengthy cycle time for ring-to-ring transfer due to manually handling the row bars.

Therefore, what is needed is a system and method that reduces the amount of row bar handling and damage during lapping operations and results in increased yield and reduced cycle time at the row bar lapping operation.

SUMMARY

Several aspects of the present invention will be described more fully hereinafter with reference to various embodiments of apparatuses and methods related to lapping row bars during the fabrication of magnetic heads, which are used in magnetic disk drives.

One aspect of a method used to lap row bars during a head fabrication process includes providing a row bar with a first side of the row bar adhered to a first single-sided adhesive film, mounting the row bar on a first lapping ring by applying a first vacuum to a non-adhesive side of the first single-sided adhesive film, and lapping a second side of the row bar while the row bar is secured to the first lapping ring at the first side of the row bar. The aspect of the method also includes transferring the row bar, with the first single-sided adhesive film attached, to a second lapping ring by applying a second single-sided adhesive film to the second side of the row bar and by applying a second vacuum to a non-adhesive side of the second single-sided adhesive film, removing the first single-sided adhesive film from the first side of the row bar while the row bar is secured to the second lapping ring at the second side of the row bar, lapping the first side of the row bar while the row bar is secured to the second lapping ring at the second side of the row bar, and dismounting the row bar from the second lapping ring.

Another aspect of a lapping ring, which is used to lap a row bar during a head fabrication process, includes a planar surface with a slot configured to hold a row bar and a single-sided adhesive film adhered to the row bar with the single-sided adhesive film between the row bar and a bottom of the slot and a vacuum channel that provides vacuum to the single-sided adhesive film.

Another aspect of a system used to transfer a row bar between lapping rings so that both sides of the row bar can be lapped includes a first holder configured to hold a first lapping ring, a second holder configured to hold a second lapping ring vertically aligned with the first lapping ring in a stacked arrangement, wherein the second holder is moveable in a vertical direction and is configured to bring the second lapping ring into contact with the first lapping ring.

It will be understood that other aspects of the present invention will become readily apparent to those skilled in the art from the following disclosure, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries. Any reference to a component having a particular shape or geometry, however, should not be construed as limited to the precise shape illustrated or described, but shall include deviations that result, for example, from manufacturing techniques and/or tolerances. By way of example, a component, or any part of a component, may be illustrated or described as rectangular, but in practice may have rounded or curved features due to manufacturing techniques and/or tolerances. Accordingly, the components illustrated in the drawings are schematic in nature and their shapes are not intended to illustrate the precise shape of the component, and therefore, not intended to limit the scope of the present invention.

In the following detailed description, various aspects of the present invention will be presented in the context of lapping row bars during the fabrication of magnetic heads used in magnetic disk drives. While these inventive aspects may be well suited for this application, those skilled in the art will realize that such aspects may be extended to other applications. Accordingly, any reference to apparatuses and methods related to lapping row bars during magnetic head fabrication processes, which are used in magnetic disk drives, is intended only to illustrate the various aspects of the present invention, with the understanding that such aspects may have a wide range of applications.

Figure 1:
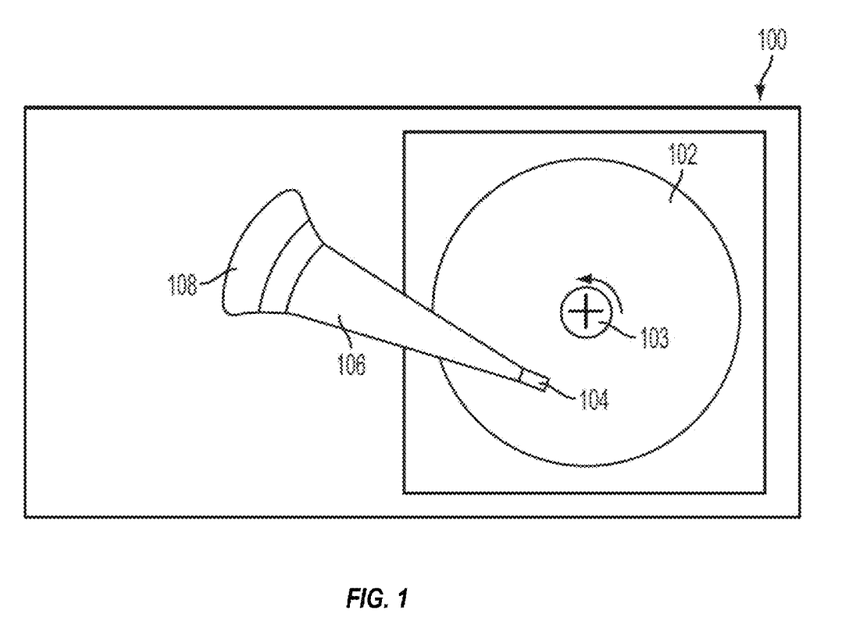
FIG. 1 is a conceptual view an exemplary embodiment of a magnetic disk drive that incorporates a magnetic head and slider.

FIG. 1 is a conceptual view of an exemplary magnetic disk drive. The magnetic disk drive 100 is shown with a rotatable magnetic disk 102. The magnetic disk 102 may be rotated on a spindle 103 by a disk drive motor (not shown) located under the magnetic disk 102. A head 104, which can be a perpendicular magnetic recording (PMR) head or lateral magnetic recording (LMR) head, may be used to read and write information by detecting and modifying the magnetic polarization of the recording layer on the disk's surface. The head 104 is generally integrally formed with a carrier or slider (not shown). The function of the slider is to support the head 104 and any electrical connections between the head 104 and the rest of the magnetic disk drive 100. The slider is mounted to a positioner arm 106 which may be used to move the head 104 on an arc across the rotating magnetic disk 102, thereby allowing the head 104 to access the entire surface of the magnetic disk 102. The positioner arm 106 comprises a head gimbal assembly (HGA), which includes a load beam and a gimbal disposed on the end of the load beam, and an actuator unit 108, as described in further detail with reference to FIGS. 4A-4B. The positioner arm 106 may be moved using a voice coil actuator, which is part of the actuator 108, or by some other suitable means.

The slider is aerodynamically designed to fly above the magnetic disk 102 by virtue of an air bearing created between the surface of the slider and the rotating magnetic disk 102. This surface of the slider is referred to as an air bearing surface (ABS). The ABS is the portion of the slider surface which is closest to the rotating magnetic disk 102, which is typically the head 104. In order to maximize the efficiency of the head 104, the sensing elements (i.e., the read and write heads) are designed to have precise dimensional relationships to each other. In addition, the distance between the ABS and the rotating magnetic disk 102 is tightly controlled. The dimension that relates to the write function is known as the throat height and the dimension that relates to the read function is known as the stripe height. Both the stripe height and the throat height are controlled by a lapping process.

The lapping process used for lapping row bars during the fabrication of magnetic heads, which are used in magnetic disk drives, can damage or break the row bars at various stages such as when the row bars are peeled from the lapping rings. Further, the cycle time needed to manually transfer row bars between lapping rings to perform backside lapping and front side lapping is significant. The damages done to the row bars, which lowers yields, and the long cycle times resulting from the ring-to-ring transfer, are both reduced with the lapping processes and apparatus' described with reference to FIGS. 2-8H. Therefore some advantages of lapping row bars using the processes and apparatus' described with reference to FIGS. 2-8H include reducing row bar handling and damage, which increases yields and reduces cycle times at the row bar lapping operation.

In one embodiment, row bars are mounted on a lapping ring using a single-sided adhesive film and a vacuum. The single-sided adhesive film adheres to the row bars, and the vacuum secures the single-sided adhesive film to the lapping ring. The row bars are mounted on a first lapping ring at a backside lapping operation using the first single-sided adhesive film and a vacuum applied through a channel in the first lapping ring to secure the first single-sided adhesive film to the first lapping ring. Backside lapping is then performed on the side of the row bars that are not attached to the first single-sided adhesive film. The first lapping ring is then vertically aligned with a second lapping ring in a stacked arrangement and moved towards one another. As a result, the row bar is sandwiched and compressed between the first single-sided adhesive film on the first lapping ring and a second single-sided adhesive film on the second lapping ring. The second single-sided adhesive is secured to the second lapping ring by a vacuum applied through a channel in the second lapping ring. The vacuum through the first lapping ring is then deactivated and the first lapping ring is retracted and separated from the first single-sided adhesive film. The first single-sided adhesive film is then peeled off the row bar as the second single-sided adhesive film adheres to the row bar. The first single-sided adhesive film is secured to the second lapping plate by the vacuum through the second lapping plate. Frontside lapping is then performed on the side of the row bars that were not previously lapped in the backside lapping process. The vacuum through the second lapping ring is then deactivated and the row bar and the second single-sided adhesive film are lifted off the second lapping ring. The second single-sided adhesive film is then peeled off the row bar. Thus, the row bar lapping ring-to-ring transfer is done automatically without peeling the row bar off the first single-sided adhesive film while manually holding the row bar.

Figure 2:
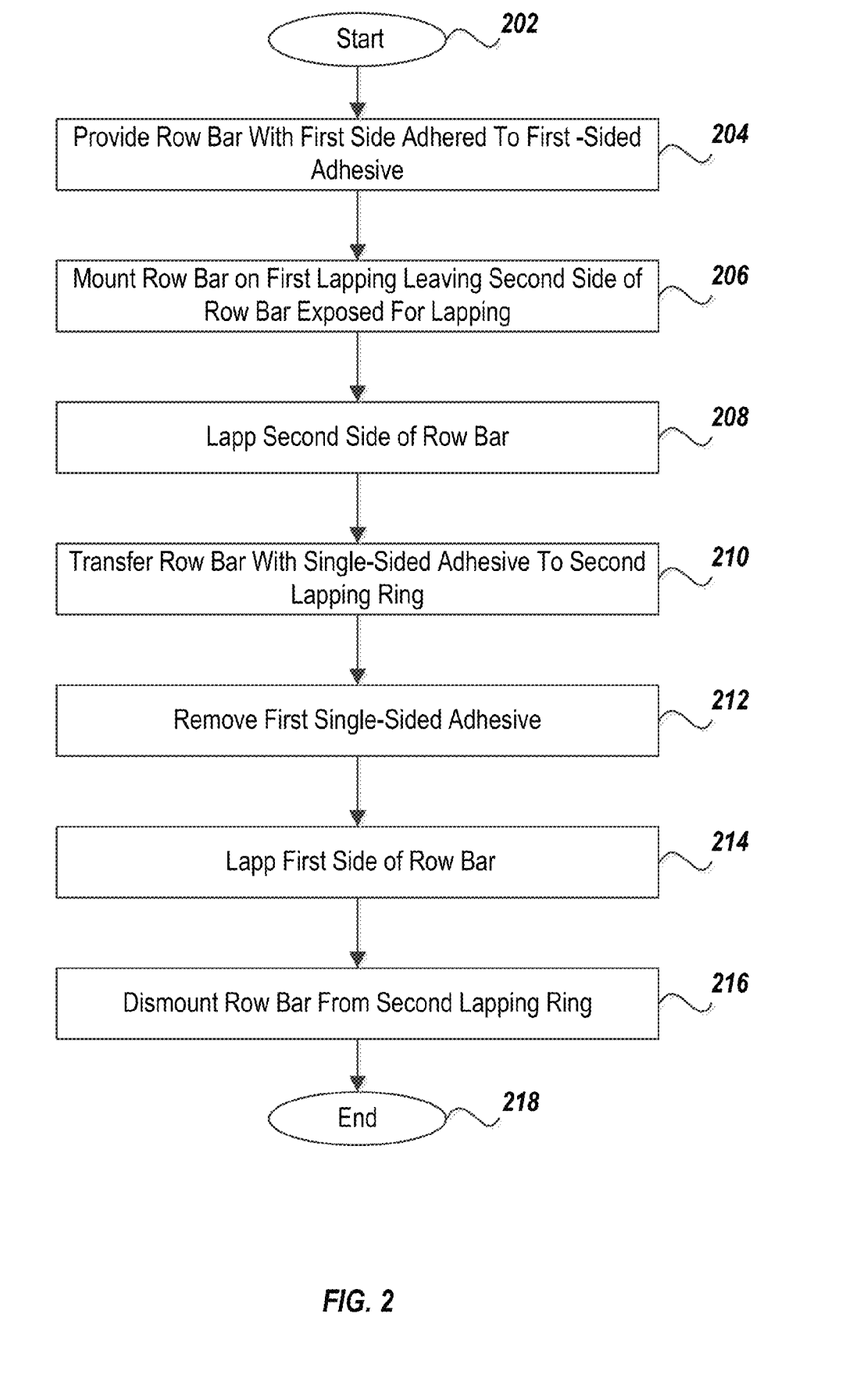
FIG. 2 is a flowchart illustrating a method of lapping row bars during a head fabrication process where row bars are provided on an adhesive.

FIG. 2 is a flowchart illustrating an embodiment of a method used to lap row bars during a head fabrication process where the row bars are provided on an adhesive. The process starts in operation 202 when process equipment, including the lapping tools, are initialized. In operation 204, at least one row bar is provided with a first side of the row bars being adhered to a first single-sided adhesive film. The adhesive can be a thermal release adhesive or ordinary adhesive, such as manufactured by Nitto Denko or other manufacturer. Next in operation 206, the row bars provided in operation 204 are mounted on a first lapping ring by applying a first vacuum to a non-adhesive side of the first single-sided adhesive film. Once the row bars are mounted onto the first lapping ring, the row bars can be pressed down to make the surface of the first lapping ring and row bars substantially flat for lapping. In operation 208, the sides of the row bars, which are exposed and do not have the first single-sided adhesive film attached, are lapped while the row bars is secured to the first lapping ring at the first sides of the row bars. This operation is referred to as backside lapping.

In operation 210, after backside lapping is performed on the row bars, the row bars are transferred to a second lapping ring while the first single-sided adhesive film remains attached. The row bars can be cleaned using de-ionized (DI) water or DI water spray before they are transferred from the first lapping ring to the second lapping ring. The first lapping ring, which has the row bars secured to it with the vacuum, and the second lapping ring are loaded onto a ring-to-ring transfer tool 700, which is described in further detail with reference to FIGS. 7-8H. A vacuum is then applied to the second lapping ring and a second single-sided adhesive film is secured to the second lapping ring via a vacuum applied through the second lapping ring to the non-adhesive side of the second single-sided adhesive film. The first and second lapping rings are then mated together using the ring-to-ring transfer tool 700. This mating process causes the lapped side of the row bars to adhere to the adhesive on the second single-sided adhesive film. The vacuum applied to the first single-sided adhesive film through the lapping ring is then turned off. The first lapping ring is then pulled away, and since the vacuum on the first single-sided adhesive film is no longer present, the row bars remain adhered to the adhesive side of the second single-sided adhesive film, which is secured to the second lapping ring via the vacuum on the non-adhesive side of the second single-sided adhesive film.

In some embodiments, after the vacuum applied to the first single-sided adhesive film is turned off, and the first and second lapping rings have been mated, pressure is applied to the first single-sided adhesive film through the vacuum line of the first lapping ring. This pressure can be atmospheric pressure or higher to help push or remove the row bars and first single-sided adhesive film from the first lapping ring. Further this atmospheric or positive pressure can be applied by pressurized air, nitrogen or other gas or liquid.

In operation 212, the first single-sided adhesive film is removed from the side of the row bars that was not lapped in operation 208. The first single-sided adhesive film is removed from the first side of the row bars while the row bars are secured to the second lapping ring via the second single-sided adhesive film and vacuum on the second lapping ring. In one embodiment, the first single-sided adhesive film is removed by peeling it off the row bars. The first single-sided adhesive film can also be removed by other techniques such as scraping or chemical processing. Once the row bars are mounted onto the second lapping ring, the row bars can be pressed down to make the surface of the second lapping ring and row bars substantially flat for lapping. The rows bars can be pressed before or after the first single-sided adhesive film is removed. In an alternative embodiment, the positive pressure which can be used to push the row bars and first single-sided adhesive film off the first lapping ring can also be used to press the row bars onto the second lapping ring.

In one embodiment where positive pressure is used, both lapping rings are installed with flow directional change valves with a one touch coupling disposed in between the vacuum line and the lapping rings. The flow directional change valves have one inlet and two outlets. The inlet is used as a vacuum line while the first outlet is used to provide vacuum to a lapping ring and the second outlet is used to release vacuum from the lapping rings to air and as an air entrance to the lapping rings instead. In one embodiment, this type of valve can have two connections thru its coupling. The connections can be either an inlet to the first outlet or a first outlet to the second outlet. The vacuum applied on the lapping rings is turn on when the coupling direction chosen is on the inlet and the first outlet. In this configuration, vacuum will flow from the inlet to the first outlet and then to the lapping rings. The vacuum applied on lapping rings is turn off when the coupling direction chosen is on the first outlet and the second outlet. In this configuration, the vacuum inside the lapping rings will be released from the first outlet to the second outlet and later on air will enter the second outlet to the first outlet and then to the lapping rings. The vacuum flow will be blocked at the inlet when the vacuum applied is turn off and vacuum will flow to the lapping ring when the vacuum applied is turn on. There is no vacuum released or normal air applied to the lapping ring when the vacuum applied is turn on.

In operation 214, the sides of the row bars, which are currently exposed and were not previously lapped, are lapped while the row bars are secured to the second lapping ring at the second side of the row bars. This operation is referred to as frontside lapping. In operation 216, the row bars along with the second single-sided adhesive film are dismounted from the second lapping ring. The second single-sided adhesive film is then removed. In one embodiment, the second single-sided adhesive film is removed by peeling it off the row bars. The first single-sided adhesive film can also be removed by other techniques such as scraping or chemical processing. In some embodiments, the row bars can be cleaned using DI water or DI water spray after the row bars are removed from the second lapping ring, either before or after the second single-sided adhesive film is removed. The process ends in operation 216 when the row bars, which have been lapped and do not have the adhesive film on them, are sent to a tray for further processing.

Figure 3A:
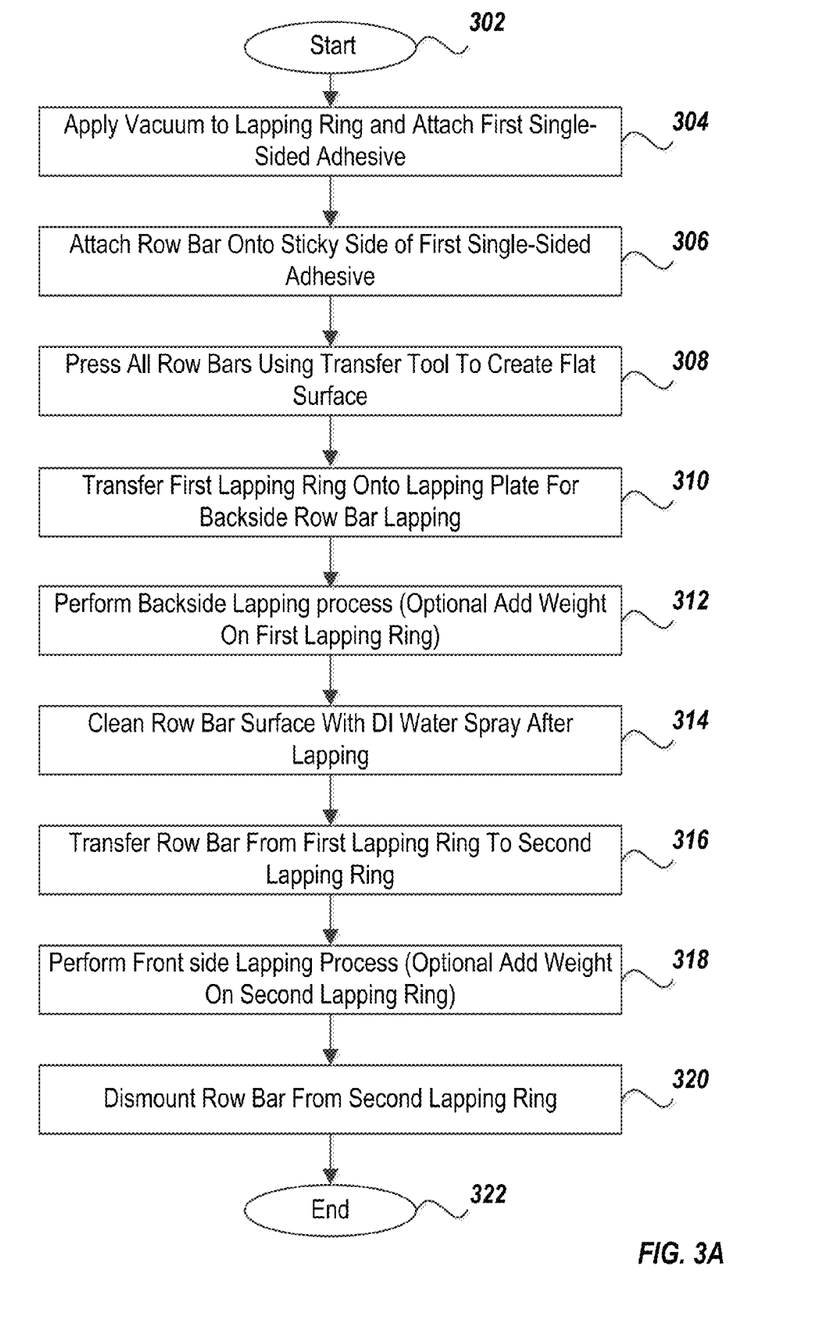
FIG. 3A is a flowchart illustrating a method of lapping row bars during a head fabrication process where row bars are provided without an adhesive.

FIG. 3A is a flowchart illustrating a method of lapping row bars during a head fabrication process where row bars are provided without an adhesive. The process starts in operation 302 when process equipment, including lapping tools, are initialized. In operation 304, a first single-sided adhesive film is mounted onto a first lapping ring and a first vacuum is applied to a non-adhesive side of the first single-sided adhesive film. The first vacuum secures the first single-sided adhesive film to the first lapping ring from the non-adhesive side of the film. In operation 306, at least one row bar is adhered to the adhesive side of the first single-sided adhesive film. Next in operation 308, the row bars are pressed down to make the surface of the first lapping ring and row bars substantially flat for lapping. In operation 310, the first lapping ring, along with the row bars adhered to the first single-sided adhesive film and the vacuum applied to the non-adhesive side of the film, are transferred to a lapping plate for lapping. In operation 312, the sides of the row bars, which are exposed and do not have the first single-sided adhesive film attached, are lapped while the row bars are secured to the first lapping ring. In some embodiments, a weight is added to the first lapping ring to improve the lapping process. This operation is referred to as backside lapping.

In operation 314, after backside lapping is performed on the row bars, the row bars are cleaned using DI water or DI water spray. In operation 316, the row bars are transferred from the first lapping ring to a second lapping ring while the first single-sided adhesive film remains attached. Further details of operation 316 are discussed with reference to FIG. 3B. In operation 318, the sides of the row bars, which were not previously lapped and are currently exposed, are lapped while the row bars are secured to the secured lapping ring. In some embodiments, a weight is added to the second lapping ring to improve the lapping process. This operation is referred to as frontside lapping.

In operation 320, the row bars along with the second single-sided adhesive film are dismounted from the second lapping ring. The second single-sided adhesive film is then removed. In one embodiment, the second single-sided adhesive film is removed by peeling it off the row bars. The first single-sided adhesive film can also be removed by other techniques such as scraping or chemical processing. In some embodiments, the row bars can be cleaned using DI water or DI water spray after they are removed from the second lapping ring, either before or after the second single-sided adhesive film is removed. The process ends in operation 322 when the row bars, which have been lapped and do not have the adhesive film on them, are sent to a tray for further processing.

Figure 3B:
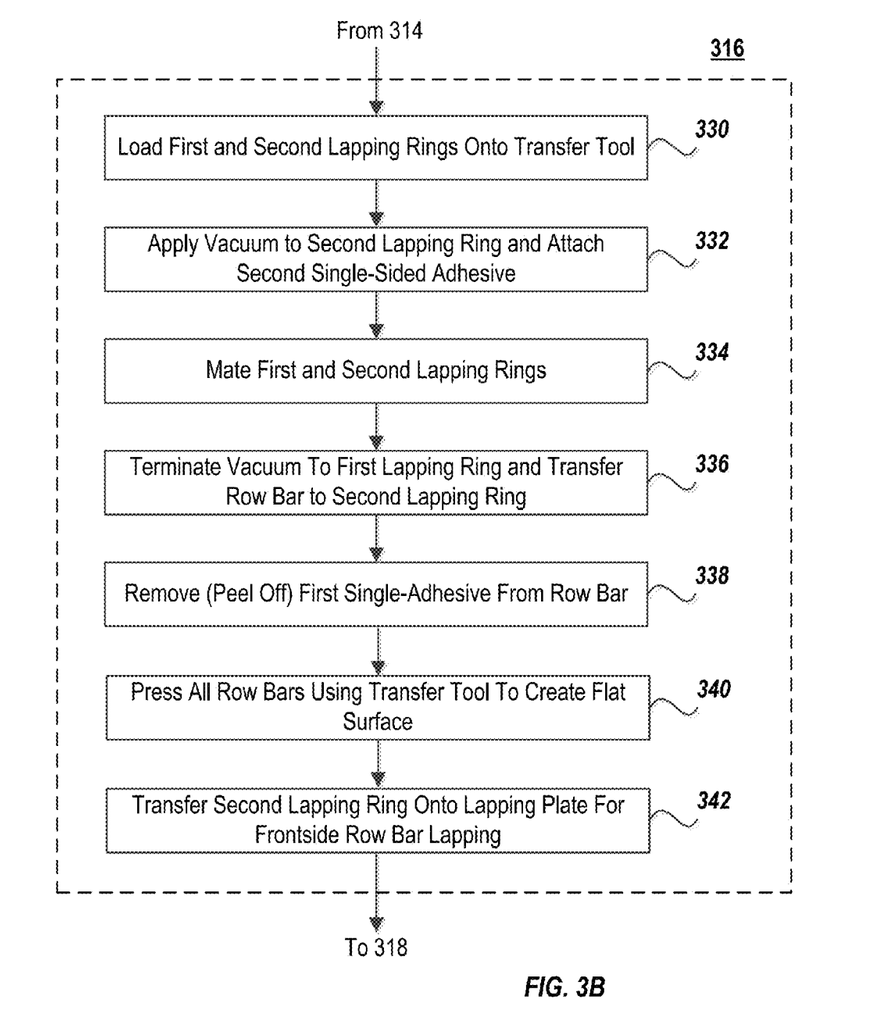
FIG. 3B is a flowchart illustrating further details of operation 316 illustrated in FIG. 3A.

FIG. 3B is a flowchart illustrating further details of operation 316 illustrated in FIG. 3A. In operation 330, which occurs after operation 314, the first lapping ring, which has the row bars secured to it with the vacuum, and the second lapping ring are loaded onto the ring-to-ring transfer tool 700, which is described in further detail with reference to FIGS. 7-8H. Next in operation 332, a vacuum is applied to the second lapping ring. This vacuum is used to secure the second single-sided adhesive film to the second lapping ring. The vacuum is applied through the second lapping ring to the non-adhesive side of the second single-sided adhesive film. In operation 334, the first and second lapping rings are mated together using the ring-to-ring transfer tool 700. This mating process causes the lapped side of the row bars to adhere to the adhesive on the second single-sided adhesive film.

In operation 336, the vacuum, which was being applied to the first single-sided adhesive film through the lapping ring, is turned off. The first lapping ring is also pulled away from the second lapping ring. Since the vacuum on the first single-sided adhesive film is turned off prior to pulling the lapping rings apart, when the lapping rings are pulled apart the row bars remain adhered to the adhesive side of the second single-sided adhesive film. The second single-sided adhesive film remains secured to the second lapping ring via the vacuum on the non-adhesive side of the second single-sided adhesive film. In some embodiments, after the vacuum applied to the first single-sided adhesive film is turned off, and the first and second lapping rings have been mated, pressure is applied to the first single-sided adhesive film through the vacuum line of the first lapping ring. This pressure can be atmospheric pressure or higher to help push and dislodge the row bars and first single-sided adhesive film from the first lapping ring. Further this atmospheric or positive pressure can be applied by pressurized air, nitrogen or other gas or liquid.

In operation 338, the first single-sided adhesive film is removed from the side of the row bars that was not lapped in operation 312. The first single-sided adhesive film is removed from the first side of the row bars while the row bars are secured to the second lapping ring via the second single-sided adhesive film and vacuum on the second lapping ring. In one embodiment, the first single-sided adhesive film is removed by peeling it off the row bars. The first single-sided adhesive film can also be removed by other techniques such as scraping or chemical processing. In operation 340, the row bars are pressed down to make the surface of the second lapping ring and row bars substantially flat for lapping. The rows bars can be pressed before or after the first single-sided adhesive film is removed. In an alternative embodiment, a positive pressure, which can be used to push the row bars and first single-sided adhesive film off the first lapping ring, can also be used to press the row bars onto the second lapping ring. In operation 342, the second lapping ring, along with the row bars are transferred onto a lapping plate for lapping. The row bars are secured to the second lapping ring by maintaining vacuum on the non-adhesive side of the second single-sided adhesive film. The process then continues on to operation 318 where frontside lapping is performed on the row bars.

Figure 4:
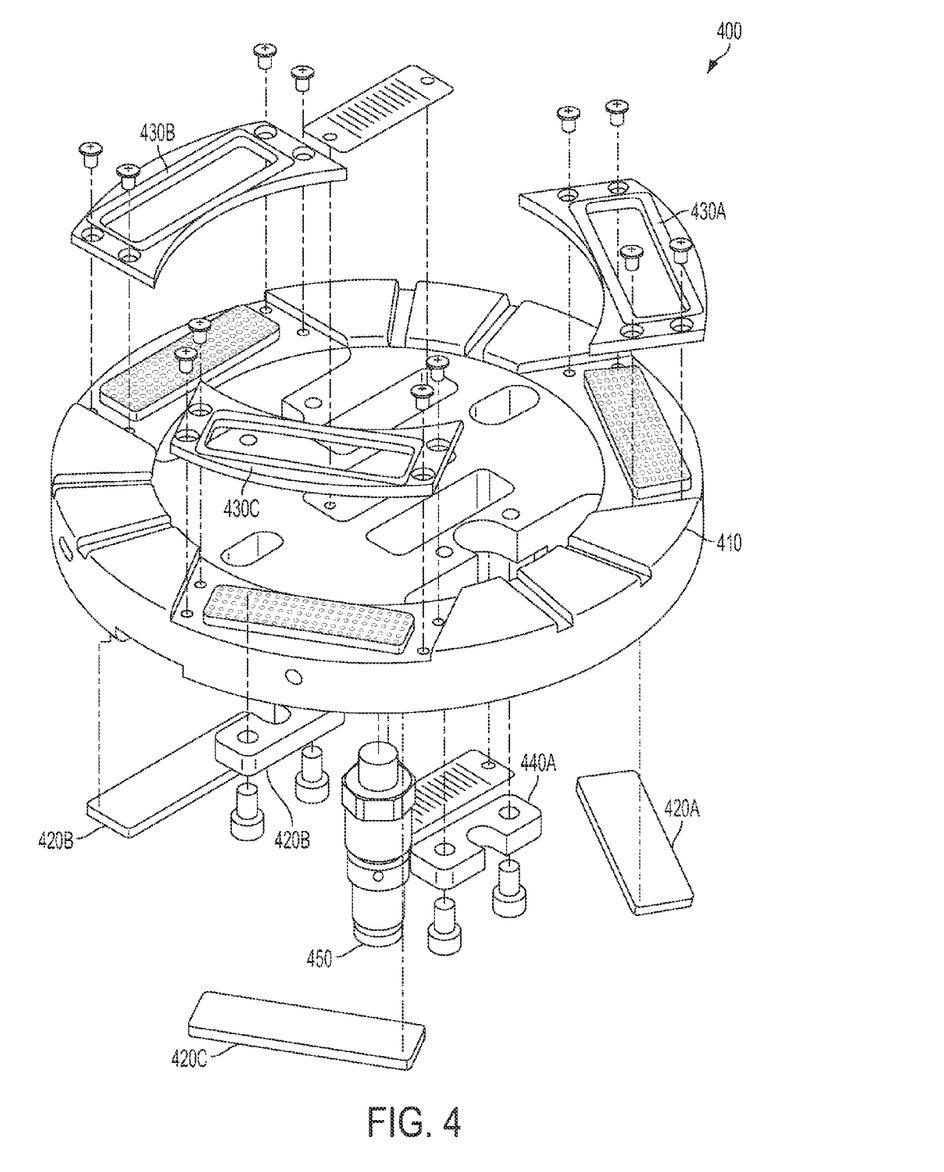
FIG. 4 is an illustration showing the components of a lapping ring apparatus used for lapping row bars during a head fabrication process.

FIG. 4 is an illustration showing the components of a lapping ring apparatus 400 used for lapping row bars during a head fabrication process. The lapping ring apparatus 400 includes a vacuum lapping ring 410, stainless steel blocks (420A, 420B, 420C) (three shown), row bar holding frames (430A, 430B, 430C) (three shown), gripper bridges (440A, 440B) (two shown), and a rotary joint 450. The vacuum lapping ring 410 is used to hold the row bars during the lapping process and includes channels for applying a vacuum to a non-adhesive side of a single-sided adhesive film with row bars adhered to the adhesive side of the single-sided adhesive film. The vacuum lapping ring 410 illustrated includes three slots for holding three sets of row bars. The slots are symmetrically disposed with their centers being spaced 120 degrees apart. The vacuum lapping ring 410 has a planar surface with three slots configured to hold three sets of row bars along with single-sided adhesive film adhered to the row bars with the single-sided adhesive films being disposed between the row bars and a bottom of the slots. The vacuum lapping ring 410 also includes a vacuum channel that provides vacuum to the single-sided adhesive film. In one embodiment, the vacuum lapping ring 410 is a ceramic lapping ring with a centrally located vacuum suction tube that channels the vacuum through the ceramic body to the single-sided adhesive film at the row bar mounting locations. Alternatively, the lapping ring 410 can be metal with a ceramic coating, or all metal such as stainless steel or aluminum.

The stainless steel blocks (420A, 420B, 420C), which are coupled to the vacuum lapping ring 410 on the opposite surface that the row bars, are secured to and are used to provide support to the back side of the vacuum lapping ring 410. The stainless steel blocks (420A, 420B, 420C) are also symmetrically disposed with their centers being spaced 120 degrees apart. The row bar holding frames (430A, 430B, 430C) (three shown) are used to support the sets of row bars to the vacuum lapping ring 410. The row bar holding frames (430A, 430B, 430C) are secured to the vacuum lapping ring 410 via bolts, screws, clamps or other attachment mechanisms. The gripper bridges (440A, 440B) (two shown) are used to assist with gripping the lapping ring apparatus 400.

The rotary joint 450 is mounted at the center of the lapping ring apparatus 400 and is used to rotate the lapping ring along with any row bars that are secured during the lapping process. Since the lapping process puts force on the lapping ring and row bars, the rotary joint is made of a rigid material that can withstand forces generated during the lapping process. Some examples of the material used for the rotary joint 450 are stainless steel and aluminum. Further, the rotary joint 450 can include a vacuum channel for applying a vacuum to the vacuum lapping ring 410. The lapping ring apparatus 400 can further include a vacuum valve that is coupled to the vacuum channel. The vacuum valve can be disposed on the rotary joint 450 or on the vacuum lapping ring 410 and is used to maintain vacuum on the single-sided adhesive film with adhered row bars during the lapping operation as well as the transfer operations described with reference to FIGS. 2-3B.

Figure 5A:
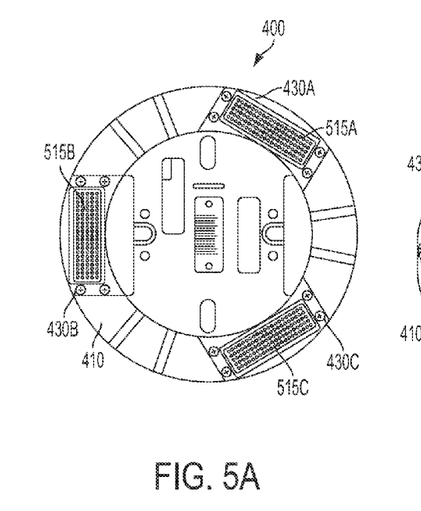
FIG. 5A is a top view of the lapping ring 400 illustrated in FIG. 4.
Figure 5B:
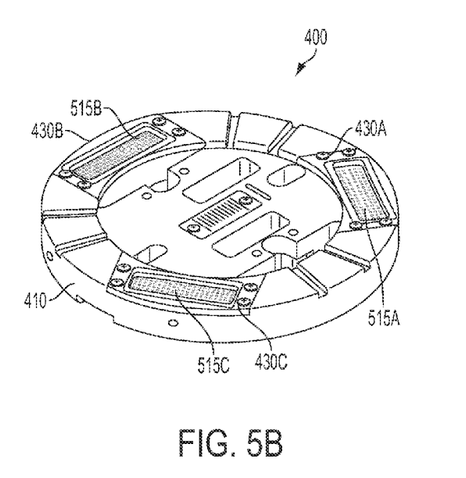
FIG. 5B is a top plan view of the lapping ring 400 illustrated in FIG. 4.
Figure 5C:
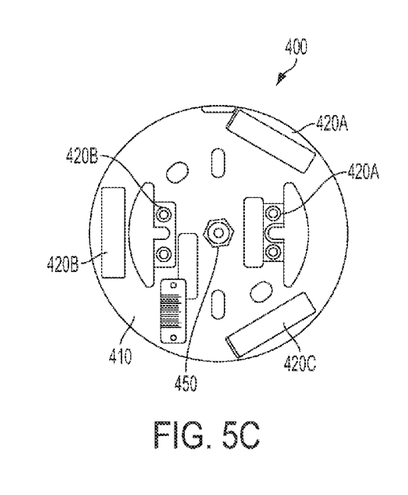
FIG. 5C is a bottom view of the lapping ring 400 illustrated in FIG. 4.
Figure 5D:
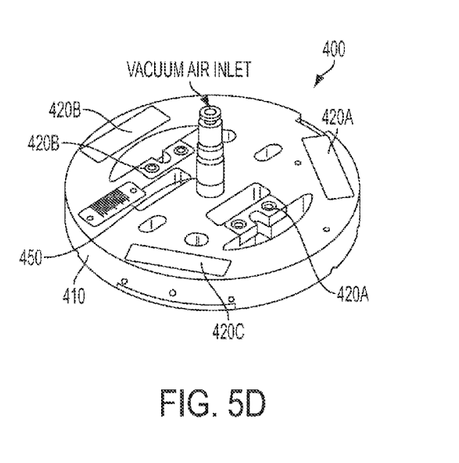
FIG. 5D is a bottom plan view of the lapping ring 400 illustrated in FIG. 4.

FIG. 5A is a top view of the lapping ring 400 illustrated in FIG. 4. FIG. 5B is a top plan view of the lapping ring 400 illustrated in FIG. 4. The top view and top plan view illustrated in FIGS. 5A-5B include a lapping ring 410, sets of row bars (three shown) (515A, 515B, 515C), which are secured by holding frames (three shown) (430A, 430B, 430C). FIG. 5C is a bottom view of the lapping ring 400 illustrated in FIG. 4. FIG. 5D is a bottom plan view of the lapping ring 400 illustrated in FIG. 4. The bottom view and bottom plan view illustrated in FIGS. 5C-5D include a lapping ring 410, stainless steels blocks (three shown) (420A, 420B, 420C), gripper bridges (two shown) (420A, 420B), and rotary joint 450. Rotary joint 450 includes a vacuum air inlet and is used to rotate the lapping ring 410.

Figure 6A:
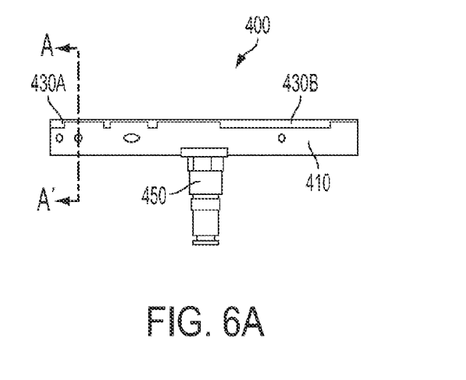
FIGS. 6A-6B are side views from different angles of the lapping ring 400 illustrated in FIG. 4.
Figure 6B:
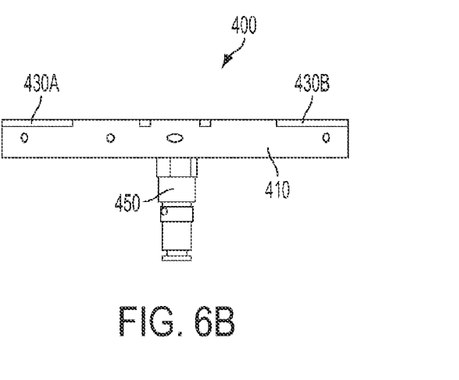
Figure 6C:
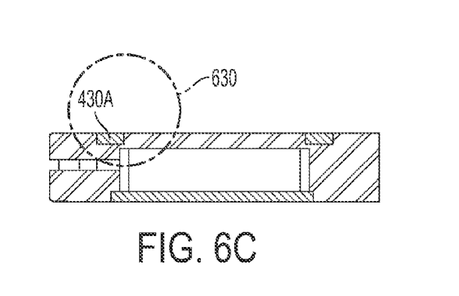
FIG. 6C is a cross sectional view of the lapping ring illustrated in FIG. 6A along cutline A-A'.
Figure 6D:
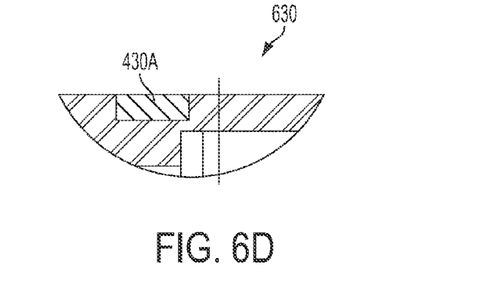
FIG. 6D is an enlarged view of the region 630 identified as a circle in the cross sectional view illustrated in FIG. 6C.
Figure 6E:
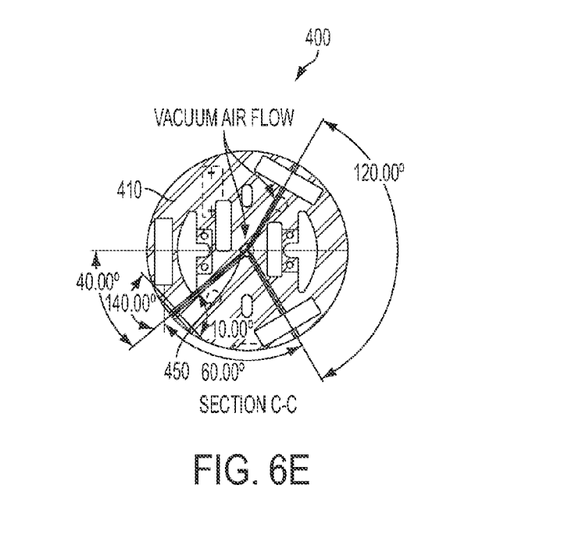
FIG. 6E is a cross sectional view for the vacuum flow of the lapping ring 400 illustrated in FIG. 4.

FIGS. 6A-6B are side views from different angles of the lapping ring 400 illustrated in FIG. 4. The side views illustrated in FIGS. 6A-6B show that the top surface of the lapping ring 410 and the row bars are substantially flat. FIG. 6C is a cross sectional view of the lapping ring illustrated in FIG. 6A along cutline A-A'. The enlarged side view illustrated in FIG. 6C further shows that the surfaces of the lapping ring 410 and the tops of the row bars are substantially flat. FIG. 6D is an enlarged view of the region 630 identified as a circle in the cross sectional view illustrated in FIG. 6C. The enlarged side view illustrated in FIG. 6D still further shows that the surfaces of the lapping ring 410 and the tops of the row bars are substantially flat. FIG. 6E is a cross sectional view for the vacuum flow of the lapping ring 400 illustrated in FIG. 4. The vacuum channels illustrated in FIG. 6E are shown to extend from the slots that hold the row bars to the rotary joint 450.

Figure 7:
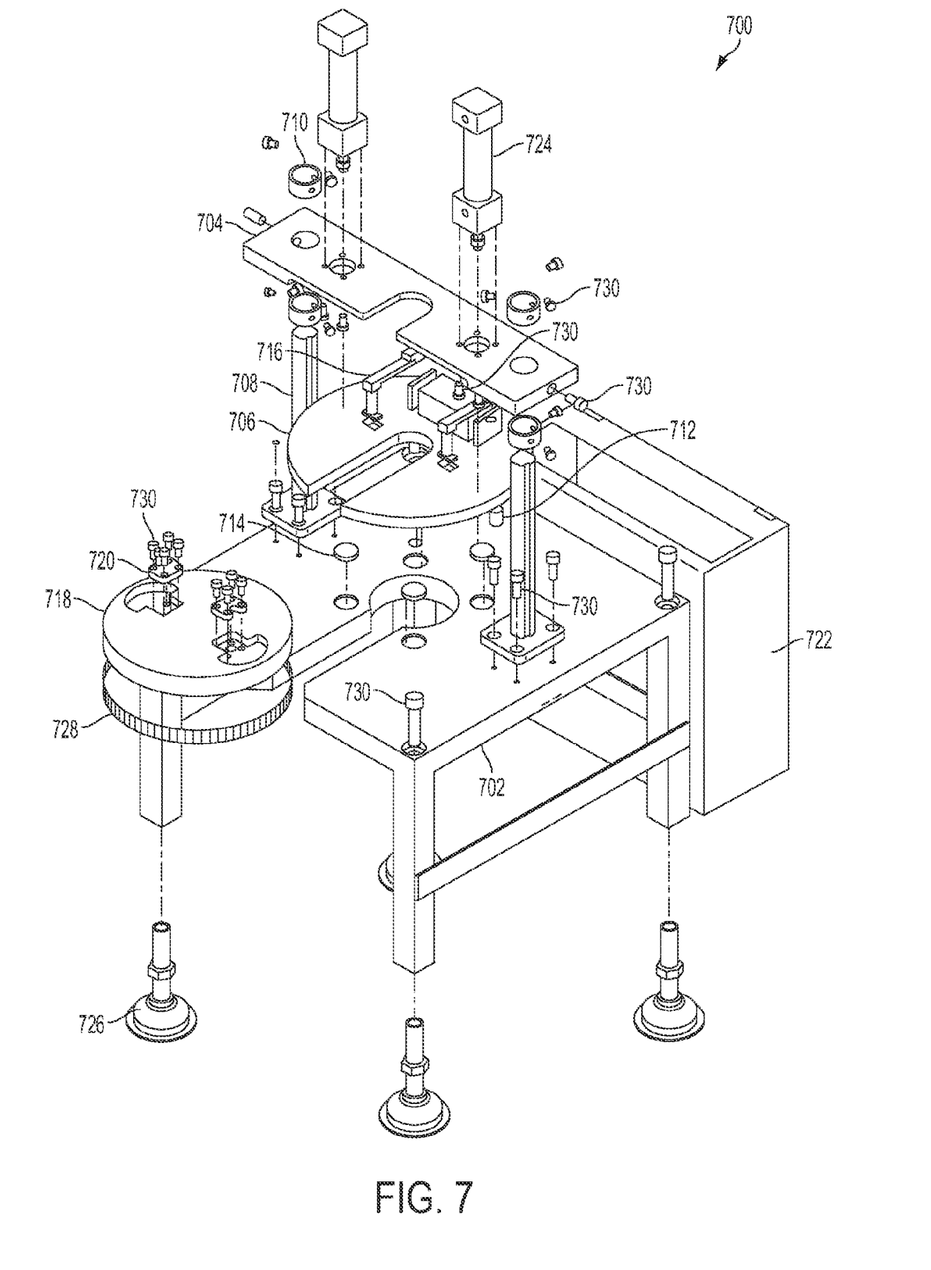
FIG. 7 is a plan view showing components of a ring-to-ring transfer tool used to transfer row bars between lapping rings for performing backside lapping and frontside lapping.

FIG. 7 is a plan view showing components of a ring-to-ring transfer tool 700 used to transfer row bars between lapping rings 410 for performing backside lapping and frontside lapping. The ring-to-ring transfer tool 700 includes a ring rest table 702, a row bridge 704, a press plate 706, shaft supports 708 (two shown), holding collars 710 (four shown), dowel pins 712 (four shown), ring rests 714 (four shown), clampers 716 (two shown), a spacer 718, clamp support blocks 720 (two shown), an electrical box 722, air cylinders 724 (two shown), adjustment pads 726 (four shown), and a hose clamp 728. The ring-to-ring transfer tool 700 further includes various connectors, screws, and bolts 730. In one embodiment both lapping rings are placed on top of the ring rest table 702 as the row bars are transferred between the lapping rings.

The ring-to-ring transfer tool 700 is used to transfer row bars between lapping rings 410 so that both sides of the row bars can be lapped. The ring-to-ring transfer tool 700 includes a first holder, which can be the ring rest table 720 that is configured to hold a first lapping ring, a second holder, which can be the press plate 706 that is configured to hold a second lapping ring vertically aligned with the first lapping ring in a stacked arrangement. The second holder, which can be the press plate 706 is moveable in a vertical direction and is configured to bring the second lapping ring into contact with the first lapping ring. The aspect of the system can also include a vacuum line configured to be attached to at least one vacuum valve disposed on the first lapping ring or the second lapping ring.

Figure 8A:
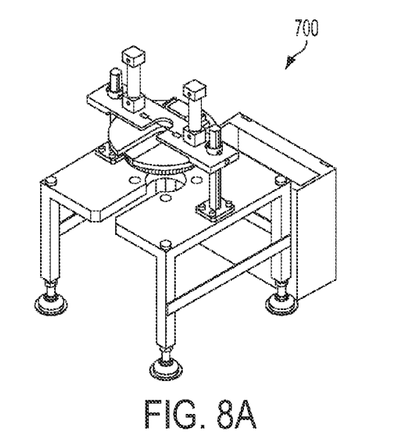
FIG. 8A is a perspective view of the ring-to-ring transfer tool 700 illustrated in FIG. 7.
Figure 8B:
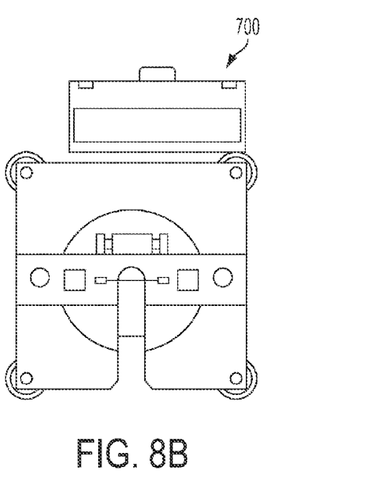
FIG. 8B is a top view of the ring-to-ring transfer tool 700 illustrated in FIG. 7.
Figure 8C:
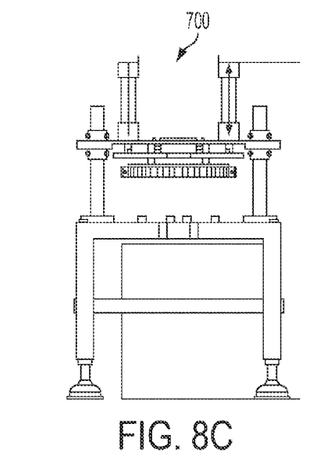
FIG. 8C is a front view of the ring-to-ring transfer tool 700 illustrated in FIG. 7.
Figure 8D:
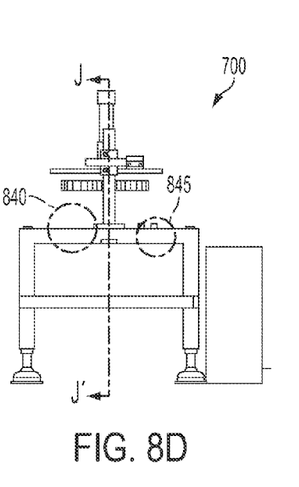
FIG. 8D is a side view of the ring-to-ring transfer tool 700 illustrated in FIG. 7.
Figure 8E:
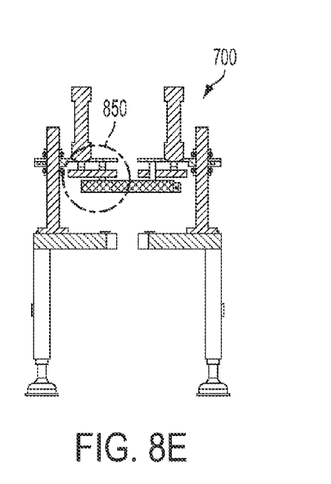
FIG. 8E is a cross section view of the ring-to-ring transfer tool 700 illustrated in FIG. 7.
Figure 8F:
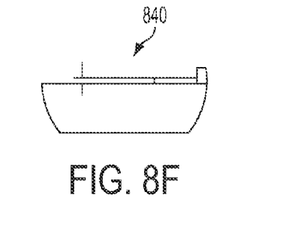
FIG. 8F is an enlarged view of the region 840 identified as a circle in the cross sectional view illustrated in FIG. 8D.
Figure 8G:
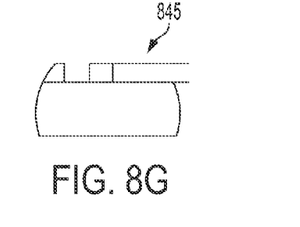
FIG. 8G is an enlarged view of the region 845 identified as a circle in the cross sectional view illustrated in FIG. 8D.
Figure 8H:
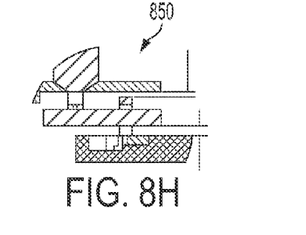
FIG. 8H is an enlarged view of the region 850 identified as a circle in the cross sectional view illustrated in FIG. 8E.

FIG. 8A is a perspective view of the ring-to-ring transfer tool 700 illustrated in FIG. 7. FIG. 8B is a top view of the ring-to-ring transfer tool 700 illustrated in FIG. 7. FIG. 8C is a front view of the ring-to-ring transfer tool 700. FIG. 8D is a side view of the ring-to-ring transfer tool 700. FIG. 8E is a cross section view of the ring-to-ring transfer tool 700 along cut line J-J' illustrated in FIG. 8D. FIG. 8F is an enlarged view of the region 840 identified as a circle in the cross sectional view illustrated in FIG. 8D. Region 840 shows a smooth precise surface that the lapping ring rests on for processing. FIG. 8G is an enlarged view of the region 845 identified as a circle in the cross sectional view illustrated in FIG. 8D. Region 845 shows a set of guides used to align the two lapping rings as the two lapping rings are mated for transferring the row bars. FIG. 8H is an enlarged view of the region 850 identified as a circle in the cross sectional view illustrated in FIG. 8E. Region 850 shows the gripper mechanism used in the ring-to-ring transfer tool 700.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
   providing a row bar with a first side of the row bar adhered to a first single-sided adhesive film;
   mounting the row bar on a first lapping ring by applying a first vacuum to a non-adhesive side of the first single-sided adhesive film;
   lapping a second side of the row bar while the row bar is secured to the first lapping ring at the first side of the row bar;
   transferring the row bar, with the first single-sided adhesive film attached, to a second lapping ring by applying a second single-sided adhesive film to the second side of the row bar and by applying a second vacuum to a non-adhesive side of the second single-sided adhesive film;
   removing the first single-sided adhesive film from the first side of the row bar while the row bar is secured to the second lapping ring at the second side of the row bar;
   lapping the first side of the row bar while the row bar is secured to the second lapping ring at the second side of the row bar; and
   dismounting the row bar from the second lapping ring.

2. The method of claim 1 further comprising adhering the first single-sided adhesive film on the first side of the row bar.

3. The method of claim 1 further comprising removing the second single-sided adhesive film from the second side of the row bar.

4. The method of claim 1 further comprising peeling the second single-sided adhesive film from the second side of the row bar.

5. The method of claim 1 wherein removing the first single-sided adhesive film from the first side of the row bar comprises peeling the first single-sided adhesive film from the first side of the row bar.

6. The method of claim 1 further comprising applying the first vacuum through a first channel in the first lapping ring to secure the first single-sided adhesive film to the first lapping ring.

7. The method of claim 1 wherein lapping the second side of the row bar is back-side lapping.

8. The method of claim 1 wherein lapping the first side of the row bar is front-side lapping.

9. The method of claim 1 wherein transferring the row bar with the first single-sided adhesive film attached to a second lapping ring further comprises:
   vertically aligning the first lapping ring and the second lapping ring with one another in a stacked arrangement; and
   disposing the row bar between the first single-sided adhesive film on the first lapping ring and the second single-sided adhesive film on the second lapping ring.

10. The method of claim 9 further comprising compressing the row bar between the first single-sided adhesive film on the first lapping ring and the second single-sided adhesive film on the second lapping ring.

11. The method of claim 9 further comprising:
   deactivating the first vacuum; and
   separating the first lapping ring from the first single-sided adhesive film.

12. The method of claim 1 wherein dismounting the row bar from the second lapping ring is done by deactivating the vacuum applied to the non-adhesive side of the second single-sided adhesive film.

13. The method of claim 1 further comprising applying the second vacuum through a second channel in the second lapping ring to secure the second single-sided adhesive film to the second lapping ring.

14. The method of claim 1 wherein transferring the row bar from the first lapping ring to the second lapping ring is done automatically without peeling the row bar off the first adhesive film.

* * * * *